April 26, 1960  H. E. CARNAGUA  2,933,944
OVERDRIVE TRANSMISSION
Filed Dec. 18, 1939  3 Sheets-Sheet 3
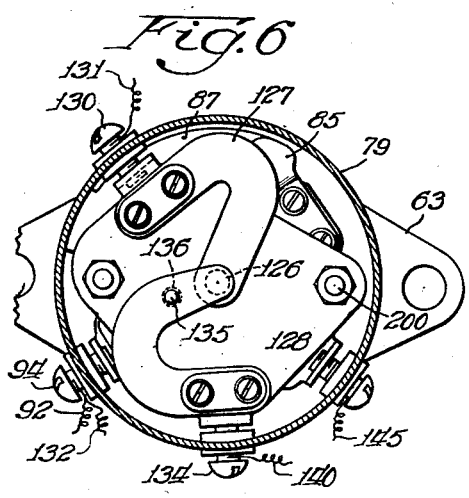
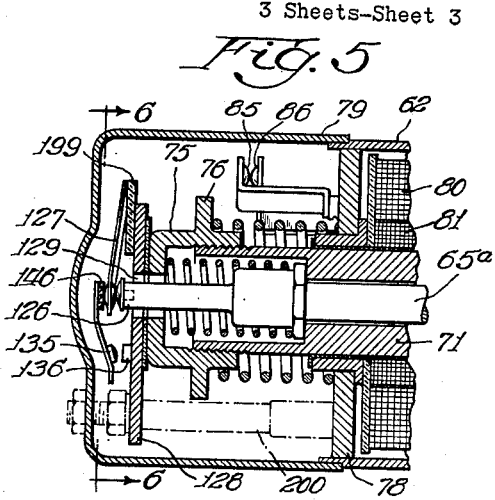
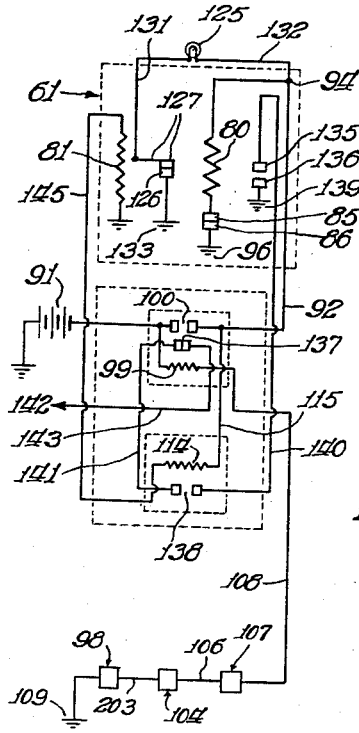
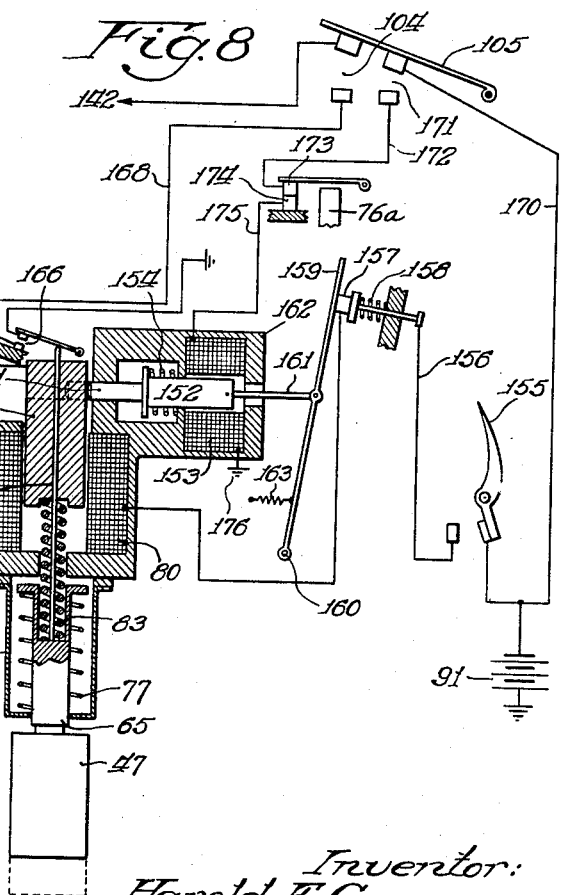
Inventor:
Harold E. Carnagua
By: Edward C. Gritzbaugh
Atty.

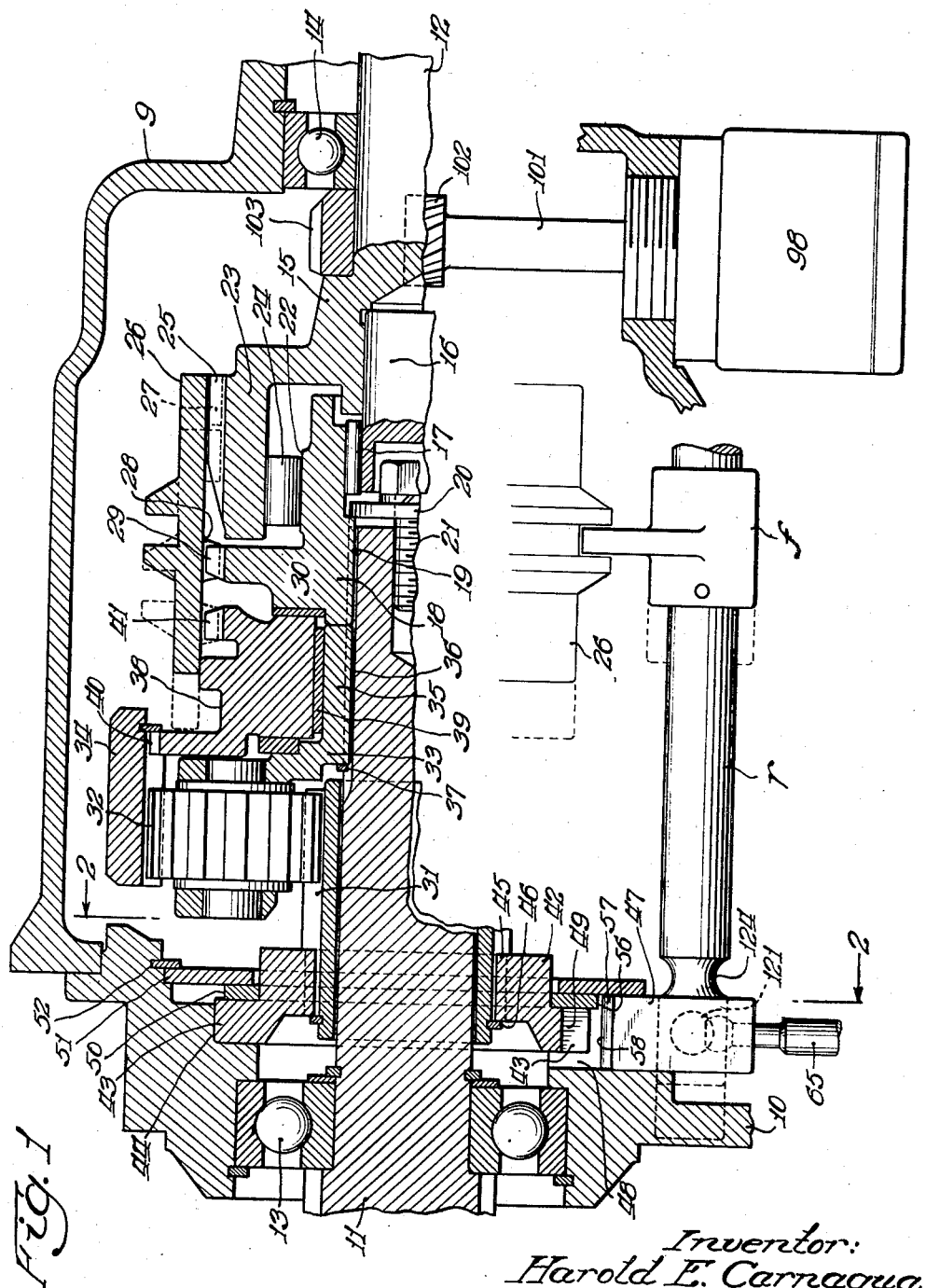

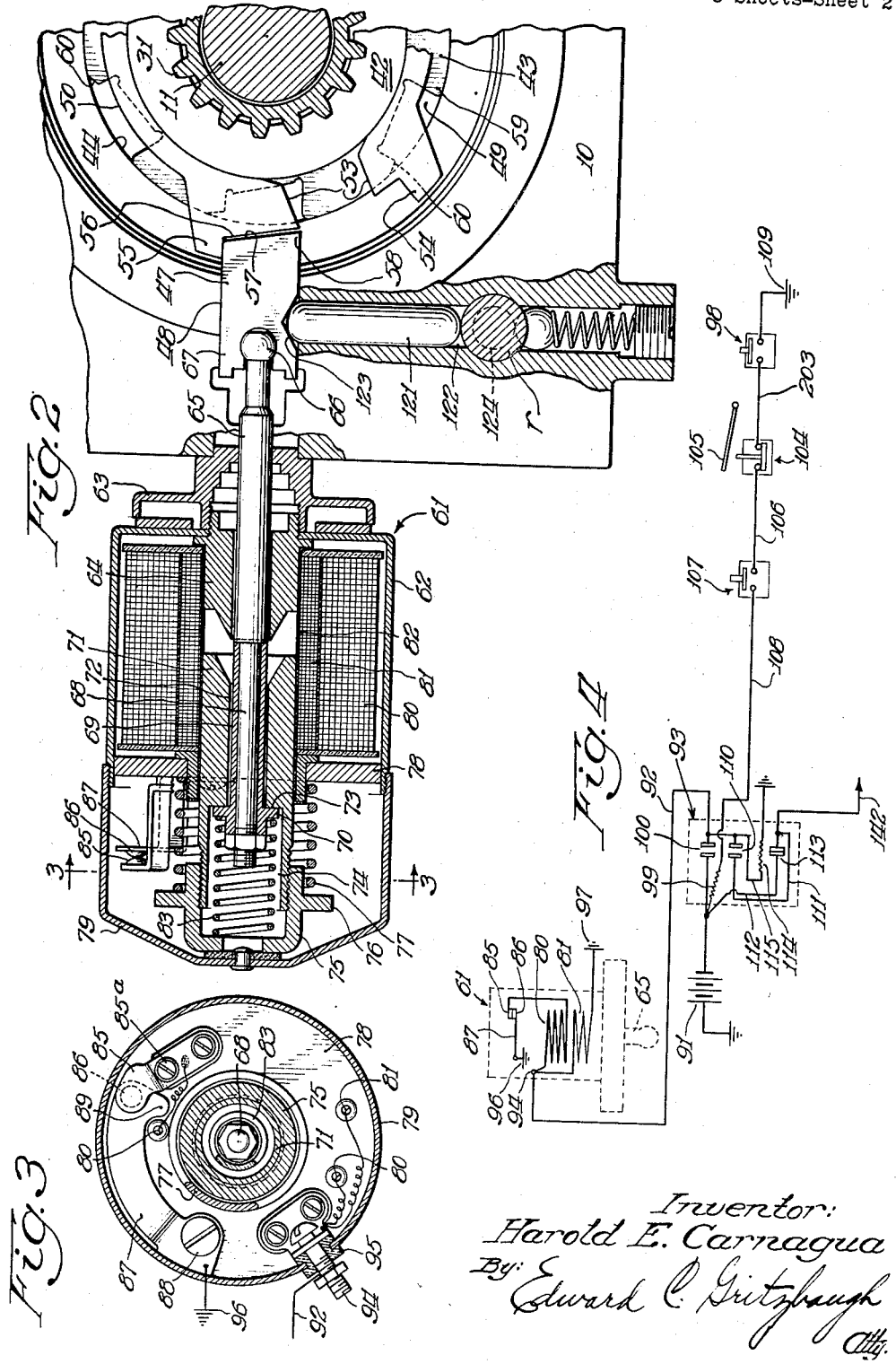

United States Patent Office 2,933,944
Patented Apr. 26, 1960

2,933,944

OVERDRIVE TRANSMISSION

Harold E. Carnagua, Muncie, Ind., assignor to Borg-Warner Corporation, Chicago, Ill., a corporation of Illinois Application December 18, 1939, Serial No. 309,718

61 Claims. (Cl. 74—472)

This invention relates to overdrive transmissions for motor vehicles, and has as its general object to provide an overdrive transmission of simplified construction, adapted to establish alternatively, between a driving and a driven shaft, a two-way direct drive, a one-way direct drive at low and intermediate speeds, or an overdrive around said one-way drive at high speeds, and which in addition provides manually operated means for rendering the overdrive inoperative and forcing the transmission to pick up the drive through the one-way direct drive within the range of overdrive speeds in order to give more powerful acceleration in the overdrive range when the occasion may demand such acceleration.

In the conventional overdrive transmission, the one-way direct drive is established through the medium of an overrunning clutch interposed between the drive and driven shafts, the overdrive is developed by a planetary gearing, and the change over from direct drive to overdrive is effected by means of a centrifugal clutch, interposed between the planetary gearing and the driven shaft and adapted, at the change-over speed, to bridge across the overrunning clutch with a direct drive connection between one element of the planetary gearing and the driven shaft. The centrifugal clutch, commonly employed for this purpose, is known in the trade as a "Keller" clutch, after the inventor thereof. The manufacture of these clutches requires rather careful machining and fine balancing, and the present invention aims to eliminate a considerable portion of this expense by eliminating the centrifugal clutch from the overdrive assembly.

As the means for "kicking down" the transmission from overdrive to direct drive in the overdrive speed range, the invention contemplates the employment of a device for locking the sun gear against rotation, together with means for manually releasing said device from its locking position so as to free the sun gear and render the planetary mechanism inoperative. A further object of the invention is to render this sun gear releasing mechanism operative to execute the additional function of establishing the overdrive in response to an increase in speed to the change-over level, the function which was formerly executed by the "Keller" clutch. To this end, the invention contemplates a locking element which is normally maintained in released position, and which is projected into locking position under control of a governor which is set for the change-over speed. The invention further contemplates the provision of manually operable means for over-controlling the locking means so as to render the governor control inoperative and allow the locking element to return to its normal released position when such over-control means is operated. Manual operation of the over-control means may be executed by the depression of the accelerator pedal of the vehicle in which the transmission is installed, to its extreme limit of depression.

Another object of the invention is to provide an arrangement of the type specified above, wherein there is provided means for blocking the advance of the locking element and thereby preventing the overdrive becoming effective, until a reversal of torque on the driving shaft is produced by deceleration of the engine, whereby the operator may, on acceleration, maintain the transmission in direct drive beyond the change-over speed, until he is ready to allow it to go into overdrive. To this end, the invention provides a balk ring, in frictionally driven association with the sun gear by which it is adapted to be biased in blocking relation to the locking element as long as the sun gear continues to rotate in the same direction, but adapted, when the sun gear is reversed by the reversal of torque previously mentioned, to oscillate to a position wherein it allows the locking element to proceed to locking position. In order that the projection of the locking element toward locking position may be arrested in an intermediate position, the projecting mechanism includes yieldable energy storing means whereby the locking element may be biased in the intermediate position when the speed reaches the change-over level, and subsequently be advanced to the locking position when the blocking mechanism permits such advance.

As the means for projecting the locking element, the invention contemplates an electrically energized device such as a solenoid, which is particularly adapted to remote control. Since such a solenoid must be capable of maintaining the energy storing mechanism biased during the period following the operation of the governor and the completion of the advance of the locking element to locking position, the problem of conserving the electrical energy consumed by the solenoid must be dealt with. Accordingly, the invention provides an arrangement wherein the solenoid which initially biases the locking element, may become deenergized when the biasing is effected, and, in order to hold the locking element in its biased position, provides a holding means which remains effective after such solenoid is deenergized. This holding means may be in the form of a mechanical latching device, or an auxiliary coil in the solenoid.

Other objects, the advantages and uses of the invention will become more apparent after reading the following specification and claims, and after consideration of the drawings forming a part of the specification, wherein:

Fig. 1 is a schematic axial sectional view through an overdrive transmission embodying the invention;

Fig. 2 is a transverse sectional view thereof taken as indicated by the line 2—2 of Fig. 1;

Fig. 3 is a detailed sectional view taken transversely through the outer end of the solenoid unit, as indicated by the line 3—3 of Fig. 2;

Fig. 4 is a wiring diagram of the control apparatus;

Fig. 5 is a sectional view through a portion of the solenoid unit of a modified form of the invention;

Fig. 6 is a transverse sectional view of the solenoid shown in Fig. 5, taken as indicated by the line 6—6 of Fig. 5;

Fig. 7 is a wiring diagram of the control mechanism of the form of the invention shown in Fig. 5; and Fig. 8 is a schematic view of a further modified form of the invention.

As an illustration of one form in which the invention may be embodied, I have shown in Figs. 1, 2, 3 and 4 an overdrive mechanism adapted to be attached to the rear end of the conventional change speed transmission of a motor vehicle. Such an overdrive transmission may include a housing 9, attachable to the rear end of the transmission housing 10. A driving shaft 11 and a driven shaft 12 are journalled by means of bearings 13 and 14 respectively. The driving shaft 11 may constitute an extension of the driven shaft of the conventional change speed transmission. The driven shaft 12, commonly referred to as the "tail shaft" may be connected by suitable universal joint mechanism to the propeller shaft of the motor vehicle. The forward end of the driven shaft 12 is formed with an enlarged head portion 15 in which is securely mounted a pilot 16 the projecting forward end portion of which is journalled through the medium of needle bearings 17 in a sleeve 18 splined at 19 upon the rear end of the drive shaft 11 and secured in place by a washer 20 engaging the ends of the splines 19 and a screw 21 threaded into the end of the shaft 11.

Formed on the exterior of the sleeve 18 is the cam element 22 of an overrunning clutch. The drum portion 23 of the overrunning clutch is formed as an extension of the head 15, and a series of rollers 24 are interposed between the drum 23 and the cam member 22 so as to establish in a conventional manner, when the drive shaft 11 tends to rotate ahead of the driven shaft 12, wedging engagement between the cam member 22 and drum 23, thereby providing a one-way direct drive from the drive shaft 11 to the driven shaft 12.

The periphery of the drum 23 is formed with clutch teeth 25. An axially shiftable clutch sleeve 26 has teeth 27 in axially slidable driving engagement with the teeth 25, and teeth 28 adapted, when the sleeve is shifted to the right as shown in Fig. 1, to intermesh with teeth 29 formed on the periphery of a radially projecting flange-like jaw clutch member 30 integral with the sleeve 18, thus establishing a two way direct drive between the drive shaft 11 and driven shaft 12.

The sleeve 26 is adapted to be manually shifted by means of a fork *f* mounted on a shift rail *r*, the latter having a conventional operating association with the change speed gear shifting mechanism of the transmission to which the overdrive is attached, whereby when the transmission is shifted to reverse drive, the rail *r* will be moved to the right as viewed in Fig. 1, establishing the two way direct drive as described above, and, when the transmission is restored to neutral or forward drive, the rail *r* will return to its normal overdrive establishing position shown in dotted lines in Fig. 1. Suitable means (not shown) are provided for thus returning the rail.

Overdrive is established through the medium of planetary gearing including a sun gear 31, planet gears 32 journalled on a planet carrier 33, and a ring gear 34. The planet carrier 33 includes a hub portion 35 which is splined at 36 upon the drive shaft 11, and secured between the sleeve 18 and a snap ring 37 recessed into the shaft 11. The ring gear 34 is mounted upon a mounting ring 38 journalled on the carrier hub 35 through the medium of a bushing 39. Peripheral teeth 40 on the ring 38 interengage with the teeth of the ring gear 34 to form a driving connection between the ring gear and the mounting ring 38. The mounting ring 38 in turn is adapted to be drivingly connected to the driven shaft 12 through the medium of jaw clutch teeth 41 formed on its periphery, and the clutch sleeve 26, the teeth 28 of which are adapted to engage with the jaw clutch teeth 41 when the sleeve is shifted to the left as viewed in Fig. 1.

The sun gear 31 is in the form of a sleeve encircling the drive shaft 11 but out of contact therewith. It is supported by a locking ring 42 which in turn is supported in the housing 10 through the engagement of the peripheral faces of its radially projecting teeth 43 within a bore 44 machined in the housing. The ring 42 is attached to the sun gear 31 by means of teeth 45 formed in its inner periphery and intermeshing with reduced sections of the sun gear teeth, and is held against axial movement by the shouldered ends of the full section sun gear teeth and a snap ring 46 recessed into the sun gear.

At underdrive speeds, the locking ring 42 is free to rotate within the bore 44 and the entire planetary mechanism will rotate as a unit with the driving and driven shafts. Overdrive is established by locking the sun gear 31 against rotation so that it becomes a reaction member against which the planet pinions 32 may track as they are swung in their orbits by the planet carrier, and thereby transmit to the ring gear 34, rotation at a higher rate of speed than that of the driving shaft.

The means for locking the sun gear against rotation comprises a locking element 47 mounted in a recess 48 in the housing 10 for longitudinal sliding movement in a direction that is radial with repect to the axis of the sun gear. The locking element 47 is adapted to engage in one of the recesses 49 formed between the teeth 43 of the locking ring 42. Means, which will hereinafter be described, as provided for yieldingly biasing the locking element 47 towards the locking ring 42 when the changeover speed of rotation of the driven shaft 12 is reached.

I provide means whereby, under the operator's control, the locking element 47 may be restrained from completing its advance to locking position after having been biased toward that position as stated above. Such means comprises a balk ring 50 journalled upon the periphery of the locking ring 42 and axially positioned between the teeth 43 of the ring 42, and a retainer ring 51 which is secured in place by a snap ring 52. The balk ring 50 is split to provide a space 53 through which the locking element 47 may be projected. It is provided with circumferentially spaced, radially projecting stop fingers 54 and 55 adapted to engage the locking element 47 when the latter is in its retracted position so as to define limits between which the balk ring 50 may oscillate. Between the finger 55 and the space 53, the balk ring is formed with a shoulder 56 against which the inner end 57 of the pawl 47 may engage. As a result of constricting frictional driving engagement between the ring 50 and the hub of the ring 42, the ring 50 is adapted, when the sun gear 31 is rotating in a counter-clockwise direction as viewed in Fig. 2, to be indexed to the position shown in Fig. 2, wherein the locking element 47, when biased toward locking position, will be arrested by the shoulder 56. Such counter-clockwise rotation of the sun gear will result from the sun gear and planet gear units of the planetary mechanism rotating together synchronously when a 1:1 drive ratio is in effect between the drive and driven shafts.

Deceleration of the driving shaft will cause the sun gear to reverse its direction of rotation relative to the housing, as will be more fully explained hereinafter, whereupon the balk ring 50 will be moved in a clockwise direction until the locking element 47 enters the space 53.

In most instances, a locking element 47 as it enters the space 53 will engage against the peripheral surface of one of the teeth 43. The advance end 57 of the locking element is chamfered as shown so that, as the tooth 43 thus engaged rotates past the locking element, the leading corner 58 of the locking element may gradually enter the notch 49 between the tooth against which the locking element is engaged, and the next adjacent tooth. Thus, when the notch 49 is in register with the locking element 47, the corner 58 will overlap the corner 59 of the following tooth 43, arresting the rotation of the locking ring 42 and allowing the locking element 47 to advance into the notch 49 so as to lock the ring 42 against rotation in either direction. In order to provide for greater depth of preliminary penetration of the locking element into the notch 49, a trailing corner of each tooth 43 is chamfered as at 60.

The means for biasing the locking element toward locking position comprises a solenoid unit which is indicated generally at 61. The solenoid 61 comprises a casing 62 attached to the housing 10 by means of a base 63. It is attached to the base 63 by means of a bushing 64. An operating rod 65 is slidably mounted in the bushing 64 and has at one end a head 66 engaged in a socket 67 in the locking element 47. At its other end, the rod 65 has a reduced portion 68 on which is mounted a sleeve 69 formed with a head 70. The sleeve 69 is slidably mounted in the hollow armature 71 and the head 70 bears against a shoulder 73 formed between the bore 72 and the enlarged bore 74 of the armature. Threaded on to the end of the armature is a cap 75 having a flange 76 against which a coil spring 77 is compressed so as to urge the armature outwardly, the armature in turn, by the engagement of its shoulder 73 against the head 70 of the operating rod 65, urging the locking element 47 toward its disengaged position. The other end of the spring 77 bears against a wall 78 mounted in the casing 62. A removable cap 79, forming part of the housing 62, encloses the spring 77, the cap 75, and associated mechanism.

The means for moving the locking element toward locking position comprises a pair of solenoid coils 80 and 81 surrounding a core sleeve 82 in which the solenoid armature 71 is slidably mounted. When the coils 80, 81 are energized, the armature 71 and cap 75 are pulled inwardly further compressing the spring 77, and compressing a lighter spring 83 which is engaged between the cap 75 and the operating rod head 70. The compression of the spring 83 occurs as a result of the arresting of the locking element 47 by the shoulder 56 of the balk ring 50. That is, the armature 71 moves inwardly to the limit of its possible movement, while the operating rod and locking element move only the slight distance separating the end 57 from the shoulder 56 and thence remain stationary while the spring 83 is compressed. Thus, the spring 83 stores energy for completing the advance of the locking element 47 to locking position when the latter is allowed to do so by the balk ring 50.

More power is required to initially move the armature 71 into the solenoid coil, than to hold it after it has arrived at its advanced position. Since a considerable interval may in some cases elapse after the energization of the solenoid and before the final projection of the locking element, the invention contemplates the conservation of electrical energy by deenergizing the outer coil 80 as soon as the biasing movement is completed, and provides the coil 81 for the purpose of holding the armature in its advanced position until locking element projection is completed.

For deenergizing the solenoid coil 80, I provide a switch including a contact 85 mounted as at 85a on the wall 78, and a contact 86 carried by a relatively long flexible arm 87 secured as at 88 to the wall 78 and having a lip 89 projecting radially inwardly so as to be engaged by the flange 76 of the cap 75 as the latter approaches its limit of inward movement. Such engagement of the contact arm 87 springs it away from the contact 85, thus breaking the circuit (which will now be described) by means of which the coil 80 is energized.

The solenoid 61 is energized by electrical energy which may be taken from the battery 91 of the motor vehicle in which the overdrive is installed, through a conductor 92 under the control of a relay circuit indicated generally at 93. The conductor 92 is connected to a terminal 94 entering the relay housing cover 79 through a suitable insulating sleeve 95, and from the terminal 94 current is directed to the solenoid coils 80 and 81 respectively as indicated. The coil 80 is grounded as indicated at 96, through the switch 85, 86. The coil 81 is grounded directly as at 97.

Energization of the solenoid 61 is initiated by a speed responsive circuit controlling governor 98, adapted when closed, to energize the operating coil 99 of a relay switch 100 which is interposed in the line 92 and adapted to normally remain open so as to deenergize the solenoid circuit. The governor 98 is preferably incorporated in the overdrive mechanism, mounted in the casing 9 as shown in Fig. 1, and having a shaft 101 provided with a helical gear 102 driven by a helical gear 103 on the driven shaft 12. However, the governor may be in the form of a wind switch responsive to changes in the velocity of air traveling past the engine of the vehicle, as is more particularly disclosed in the Fig. 8 embodiment. The governor 98 is connected to the coil 99 by a conductor 203, a kick-down switch 104, normally closed and adapted to be opened by depression of the throttle 105 to the full limit of its possible downward stroke, a conductor 106, a gear switch 107, and a conductor 108, arranged in series in the order named. The other side of the governor 98 may be grounded as indicated at 109.

Forcing back the mechanism from overdrive to direct drive is initiated by opening the switch 104, which deenergizes the relay coil 99, thereby opening the relay switch 100 and deenergizing the solenoid so as to remove the resistance of the holding coil 81 to the action of the spring 77 tending to retract the locking element 47. As long as torque is being exerted against the locking element 47 by the locking ring 42 however, there will be a tendency for the locking element to be gripped between the embracing teeth 43 of the locking ring and thereby held in locked or engaged position. To overcome this condition, the invention provides means for effecting momentary reversal of torque on the locking ring 42, opening the ignition circuit of the engine for a brief interval of time. To this end, the invention provides a relay switch 110, controlled by the operating coil 99, adapted to feed the ignition circuit 142 through a conductor 111 when the coil 99 is energized, and adapted to open as a result of the deenergizing of the relay coil 99 by the opening of the kick-down switch 104. Current is normally carried to the ignition circuit through a conductor 112 and a relay switch 113 which is normally biased to closed position and adapted to be opened by a relay operating coil 114 connected by a conductor 115 and the switch 100 to the battery 91. Thus, when the relay switches 100 and 110 are closed, the switch 113 will open and will be standing open at the time the switch 110 is opened by the kick-down operation. The relay 113, 114 is, however, a delayed action relay and consequently the switch 113 will not close simultaneously with the opening of the switch 110, but will remain open for a short interval during which the flow of energy to the ignition will be interrupted and the engine will exert a braking effect producing a momentary reversal of torque on the overdrive mechanism and relieving the wedging engagement between the teeth 43 and the pawl 47. Thereupon, the spring 77 will withdraw the pawl to its retracted position.

In order to guard the overdrive mechanism against damage which would result from any attempt to shift the sleeve 26 rapidly to the two-way direct drive position while the overdrive is in effect, I provide an interlocking mechanism which prevents the sleeve 26 being shifted to the two-way direct drive position while the sun gear is locked, and which prevents the sun gear from being locked while the sleeve 26 is in the two-way direct drive position. This mechanism comprises an interlocking bolt 121 slidably mounted in a bore 122 in the housing 10, adapted at one end to engage in a V-shaped notch 123 in the locking element 47, and at its other end to engage in an annular groove 124 in the shift rail "r." When the sleeve 26 is in the two-way direct drive position, which is shown in full lines in Fig. 1, the interlocking bolt 121 will be forced out of the groove 124 and into the notch 123 as shown in Fig. 2. Thus, the bolt 47 is locked in its retracted position and cannot be projected from that position until the sleeve 26 is shifted to the forward drive position shown in dotted lines in Fig. 1, whereupon the groove 124 will register with the bolt 121 and the locking element 47 may be projected toward the sun gear by the solenoid, forcing the bolt 121 out of the notch 123 and into the groove 124 as it does so, thus locking the shift rail "r" in the forward drive position.

In the operation of the invention, the shift rail "r" will normally remain in the forward drive position shown in dotted lines in Fig. 1, and the pawl 47 will be retracted by the yielding pressure of the spring 77 in the solenoid, to the position shown in Figs. 1 and 2. The rail "r" and sleeve 26 will remain in the forward drive position while the operator starts the engine, and shifts from neutral to first, from first to second, and from second to direct drive ratio of the transmission. During this phase of operation of the vehicle, the governor 98, operating at a speed below the overdrive establishing speed, will remain in the opened position indicated in the diagram of Fig. 4.

When the cut-in speed is reached, the switch of the governor 98 will close and the kick-down switch 104 and the gear switch 107 being already closed, a circuit will be established through these three switches and the conductors 203, 106 and 108, the relay coil 99 and the battery 91. The relay switches 100 and 110 which have been standing open under spring pressure, will then be closed by the energization of the coil 99. The closing of the switch 100 will energize the main coil 80 and holding coil 81 of the solenoid 61, the circuit being established through the conductor 92 to the terminal 94 and then through the parallel circuits of the coils 80 and 81, the grounding switch 85, 86 of the coil 80 being closed at the time.

The closing of the switch 100 also serves to energize the secondary relay coil 114 which opens the switch 113 in the ignition circuit 112, but the ignition circuit will be maintained by the closing of the switch 110, establishing a substitute circuit through the conductor 111.

The energization of the solenoid 61 causes the armature 71 to be drawn into the core sleeve 82, thus moving the locking element 47 into engagement with the shoulder 56 of the balk ring 50, and compressing the spring 83. As the armature 71 approaches fully advanced position, the flange 76 of the cap 75 will contact the ground switch arm 87 and move it out of contact with the contact 85, thus breaking the circuit through the main coil 80. The armature 71 will then be held in its advanced position by the holding coil 81 so as to maintain the locking element 47 in its biased position.

In the meantime, direct drive will be transmitted from the shaft 11 to the shaft 12 through the overrunning clutch 22, 23, 24, and the planetary gearing will rotate as a unit with the driving and driven shafts.

The overdrive mechanism is now set for the establishment of the overdrive, which is accomplished by first decelerating the drive shaft 11 so as to cause the carrier 33 to lag behind the ring gear 34 and the sun gear 31 to correspondingly lag behind the carrier 33, until the sun gear 31 ceases rotating forwardly and commences to rotate in reverse. The balk ring 50, which tends to rotate with the sun gear by reason of its frictional driving association therewith, will thereupon oscillate to a position allowing the locking element 47 to be projected under the biasing pressure of the spring 83, into locking engagement with the locking ring 42.

Thus, the sun gear becomes locked to the frame, and subsequent acceleration of the driving shaft 11 will cause the drive to be transmitted through the carrier and planet gears, tracking upon the now stationary sun gear 31, and thereby driving the sun gear forwardly at an overdrive ratio. From the sun gear the drive will be transmitted through the clutch sleeve 26 to the driven shaft 12, and the overrunning clutch 22, 23, 24 will release, allowing the driven shaft to overrun the driving shaft 11.

The transmission will proceed to operate in overdrive as long as the speed of the vehicle remains above the cut-in limit. When the speed drops below the cut-in limit, the governor switch 98 will open, allowing the switches 100 and 110 to open and the switch 113 to close. The relay 113, 114, is however, a delayed action relay, and as a result the switch 110 will open prior to the closing of the switch 113, thus momentarily breaking the ignition circuit, causing the engine to skip, and thereby interrupting the transmission of torque through the driving shaft 11 so as to allow the locking element 47 to become freed from the notch 49 in which it is engaged. Upon resumption of the drive through the shaft 11, the overrunning clutch 22, 23, 24 will re-establish the one-way direct drive between the two shafts.

If it is desired to change back to the direct drive while the vehicle speed remains above the cut-in limit, the accelerator pedal 105 is pushed to the floor boards, thereby opening the kick-down switch 104 and the ensuing action will be exactly the same as that caused by the opening of the governor switch 98.

By arranging the kick-down switch and the governor switch in series with each other, so that either one will initiate the same series of operations, the mechanism is simplified.

In the form of the invention shown in Figs. 5, 6 and 7, I provide a signal 125 which may be mounted on the dash of the vehicle, for apprising the operator when the mechanism is ready for overdrive. The signal 125, which is preferably a small lamp, is adapted to remain lighted when the transmission is operating in direct drive beyond the cut-in speed, being controlled jointly by the solenoid energizing switch 100, which is closed when the transmission is operating above the cut-in speed, and a switch 126, 127 which is closed as long as the transmission is operating in direct drive, i.e., as long as the locking element 47 is in retracted position. The switch 126, 127 includes a spring arm 127 mounted by means of an insulator 199, on a bracket 128 which in turn is mounted on posts 200 secured in the plate 78. The other side of the switch comprises a grounding connection in the form of the extension 126 of the rod 65a, which projects through registering openings 129 in the cap 75 and bracket 128 to engage the arm 127.

The switch arm 127 is connected to the lamp 125 through a terminal 130 in the cap 79, and a conductor 131. The other side of the lamp is connected to the terminal 94 by a conductor 132. The switch 126, 127 grounds the circuit as indicated at 133 in Fig. 7.

When the locking element 47 proceeds to locking position, the extension 126 will pull away from the switch arm 127 and thus open the switch 126, 127, breaking the signal circuit and causing the lamp 125 to go out. Thus the driver will be apprised of the fact that overdrive has been established.

In this form of the invention, the interruption of the ignition circuit is accomplished by shorting the circuit instead of by opening the circuit. This involves a rearrangement of the relay circuit and the provision of an additional switch 135, 136, in series with switches 137 and 138. The contact 136 of the switch 135, 136 is grounded as at 139, and the spring arm 135 thereof is connected to the switch 138 through a terminal 134 in the cap 79 and a conductor 140. The switch 138 is connected to the switch 137 by a conductor 141. The switch 137 is connected through a conductor 143 to the ignition coil indicated at 142, so that when the switches 137, 138 and 135, 136 are all closed, as will shortly be explained, the ignition coil will be grounded through the grounding circuit including the conductor 143, the switch 137, the conductor 141, the switch 138, the switch 135, 136, and the ground connection 139.

With the exception of the parts and arrangement described above, the form of the invention shown in Figs. 5, 6 and 7 is the same as and includes all of the mechanism described in connection with the preceding form of the invention.

In the operation of this form of the invention, when the speed of the vehicle exceeds the cut-in limit, the governor switch 98 will close, establishing a circuit through the conductor 203, the switch 104, the conductor 106, the gear switch 107, the conductor 108, the relay operating coil 99, and the battery 91. The energization of the coil 99 will close the switch 100, which is normally spring biased in opened position, and will open the switch 137, which is normally spring biased in closed position. The closing of the switch 100 will establish the circuit through the conductor 115 and the second relay 114, thus closing the switch 138. Simultaneously, the switch 100 will establish the circuit through the conductor 92 and the main coil 80 of the solenoid. The circuit through the second relay coil 114 includes a conductor 145 leading to the holding coil 81 of the solenoid, and thus the closing of the switch 100 serves to energize holding coil 81.

Under the pull of the coils 80 and 81, the solenoid armature 71 will move into the core sleeve 82, and the switch arm 135 of the ignition grounding circuit, which has previously been held open by the engagement of the switch arm 127 against an insulating block 146, will move into contact with the switch arm 136, thus closing the second switch of the grounding circuit, and leaving the switch 137 standing open.

The closing of the switch 100 completes a circuit through the switch 126, 127 as previously described, thus lighting the signal lamp 125. The mechanism is now set for overdrive and the lighting of the lamp 125 indicates this fact to the operator.

By deceleration of the engine, the locking element 47 is allowed to proceed into locking position as in the manner previously described, and the consequent pulling of the extension 126a away from the switch arm 127 opens the switch 126, 127 causing the signal lamp 125 to go out and indicating to the operator that the transmission is in overdrive.

The transmission will continue to operate in overdrive until the main control circuit is opened either by the opening of the kick-down switch or by the opening of the governor switch. When this occurs, the switch 100 will open, and the switch 137 will close.

The opening of the switch 100 deenergizes the second relay coil 114 and causes the switch 138 to open. However, the relay 114, 138 is a delayed action relay and as a result there is a short interval during which both the switches 137, 138 are closed, thus completing the grounding circuit and causing the engine to miss so as to allow the locking element to be withdrawn from its locking position. The retraction of the locking element 47 opens the switch 135, 136 restoring the ignition system to operative condition. At the end of a predetermined interval the opening of the switch 138 breaks the grounding circuit and reestablishes the ignition circuit in the event the locking element 47 sticks due to maloperation and is not withdrawn.

The opening of the switch 100 also breaks the circuit to the holding coil 81 of the solenoid, allowing the locking element 47 to be withdrawn under the pressure of the spring 77 as soon as it is free from the locking ring 42.

In the form of the invention shown in Fig. 8, an auxiliary solenoid operated mechanical latch is employed in place of the holding coil. Such latch comprises a bolt 151 formed on the forward end of an armature 152 adapted to be retracted by a solenoid coil 153 and to be projected by a spring 154. The governor in this form of the invention is shown as a wind switch 155 which, when closed, establishes a circuit from the battery 91 through a conductor 156, a switch 157, the main coil 80 of the solenoid 61, and the grounding connection 96.

Advancing of the armature 71 of the main solenoid 61, under the pull of the coil 80, thus energized, allows the bolt 151 to be projected behind the armature 71 by the pressure of the spring 154.

The switch 157 includes a contact yieldingly mounted as at 158 and a contact carried by an arm 159 pivoted at 160 and carrying a rod 161 projecting into the auxiliary solenoid 162 so as to be engaged by the armature 152 when the latter is retracted, thereby to cause the switch 157 to close against the pressure of the spring 163 acting upon the arm 159. When the bolt 151 is projected, the arm 159 will be allowed to move so as to open the switch 157, thus breaking the circuit through the main coil 80. The latching bolt 151 will then maintain the armature 71 in its advanced position.

The advancing of the armature 71 compresses the spring 83 and biases the pawl 47 toward locking position.

Upon deceleration of the engine, the pawl 47 will be allowed to proceed to locking position, the spring 83 overcoming the pressure of the retractor spring 77 sufficiently to complete the projection of the locking element 47. The sleeve 165 is fixed to the frame and forms a support for the shaft 65 of the locking element 47.

The projection of the locking element 47 is attended by the closing of a switch 166 normally held open by a rearward extension 126a of the push rod 65. The closing of the switch 166 sets the ignition grounding circuit 168 for operation when the accelerator pedal 105 is pushed downwardly to its limit of depression. The later action closes the kick-down switch 104 and grounds the ignition coil 142.

The auxiliary solenoid 162 is energized through a circuit including the battery 91, a conductor 170, a switch 171, a conductor 172, a switch 173, 174, a conductor 175, and the coil 153, which is grounded at 176. The movement of the accelerator pedal 105 to its downward limit closes the switch 171 at the same time the switch 104 is closed, thus completing the circuit just described. Thus, the latch 151 is withdrawn and the retractor spring 77 is allowed to withdraw the locking element 47 as the latter is released through the momentary shorting of the ignition coil.

When the locking element 47 is released, the rearward movement of the extension 126a will open the switch 166 and the switch 173, 174, which is controlled by the extension 76a of the armature 71, thereby reestablishing the ignition circuit and opening the auxiliary solenoid circuits and kick-down circuit so that the accelerator pedal may if desired be held in its limit position without wasting electrical energy.

The invention provides an arrangement wherein overdrive is established by locking the sun gear of the planetary system, such locking being accomplished by projecting a locking element under the pull of a solenoid energized by a suitable speed responsive switch, and wherein the return to direct drive is accomplished by the spring urged withdrawal of the locking element. Since the locking element is solenoid projected and spring withdrawn, it does not depend upon the maintenance of an electrical circuit for withdrawal. In former arrangements where it is was attempted to withdraw the locking element by means of a solenoid and to project it by means of a spring, it would be possible to force the locking element to remain locked in engagement with the sun gear as a result of cutting the ignition (the solenoid circuit and ignition circuit being jointly controlled by a master switch). Should this occur at a time when the vehicle was parked so as to be unable to move rearwardly, the transmission would become locked in overdrive so that it would be impossible to return it to the lower speed ratio, the engine being unable to move the vehicle while the overdrive is in effect. The present invention makes it impossible for this to occur.

The invention eliminates the conventional "Keller" clutch, and employs the sun gear locking mechanism not only for the purpose of "kicking down" the transmission from overdrive back to direct, but also for the purpose of establishing overdrive from direct. Thus, the expensive machine work involved in the "Keller" clutch is eliminated.

The term "governor" as employed in the appended claims is employed to designate any speed responsive switch, whether in the form of a conventional governor driven from one of the shafts of the transmission, or a wind switch, responsive to air velocity.

I claim:

1. In an overdrive transmission, driving and driven shafts, planetary gearing including a sun gear which is normally free so as to render said gearing inoperative, an element for locking said sun gear against rotation so as to establish, through the medium of said gearing, an overdrive connection between said shafts, a solenoid for moving said element toward locking position, governor controlled means for energizing said solenoid, yieldable means for retracting said locking element, and throttle controlled means for deenergizing said solenoid.

2. In an overdrive transmission, driving and driven shafts, planetary gearing including a sun gear which is normally free so as to render said gearing inoperative, an element for locking said sun gear against rotation so as to establish, through the medium of said gearing, an overdrive connection between said shafts, a solenoid for biasing said element toward locking position, means for holding said element in biased position, means for blocking advance of said element to locking position until rotation of the sun gear has substantially ceased, governor controlled means for energizing said solenoid, and spring means for retracting said locking element.

3. In an overdrive transmission, driving and driven shafts, planetary gearing including a sun gear which is normally free so as to render said gearing inoperative, an element for locking said sun gear against rotation so as to establish, through the medium of said gearing, an overdrive connection between said shafts, a solenoid for biasing said element toward locking position, means for holding said element in biased position, means for blocking advance of said element to locking position until rotation of the sun gear has substantially ceased, energy storing means interposed between the solenoid and said element for completing the movement of said element to locking position, and governor controlled means for energizing said solenoid.

4. In an overdrive transmission, driving and driven shafts, planetary gearing including a sun gear which is normally free so as to render said gearing inoperative, an element for locking said sun gear against rotation so as to establish, through the medium of said gearing, an overdrive connection between said shafts, a solenoid for actuating said element, said solenoid including a main coil for biasing the element toward locking position and a holding coil for holding the element in biased position, energy storing means interposed between the solenoid and the element, for completing the movement of said element to locking position, and governor controlled means for energizing said solenoid.

5. In an overdrive transmission, driving and driven shafts, planetary gearing including a sun gear which is normally free so as to render said gearing inoperative, an element for locking said sun gear against rotation so as to establish, through the medium of said gearing, an overdrive connection between said shafts, a solenoid biasing said element toward locking position, governor controlled means for energizing said solenoid, and a balk ring having limited oscillating movement relative to the housing and a frictional torque receiving association with said sun gear whereby it is adapted, as long as unidirectional rotation of said sun gear exists, to be indexed to a position wherein it blocks advance of said element to locking position, and upon reversal of rotation of said sun gear to be oscillated to a position allowing said element to be projected to locking position, said balk ring being formed with a peripheral projection adapted to contact said locking element so as to determine said blocking position, and being split to provide a space through which said locking element may advance to locking position upon reversal of rotation of the sun gear.

6. In an overdrive transmission, driving and driven shafts, planetary gearing including a planet gear assembly connected to the driving shaft, a normally free sun gear, and a ring gear, a manually operable jaw clutch constituting the sole means for drivingly connecting the ring gear to the driven shaft, said planetary gearing being adapted when the sun gear is held against rotation and the ring gear is connected to the driven shaft, to establish an overdrive connection between said shafts, an overrunning clutch adapted to establish a direct forward drive connection between said shafts when said overdrive connection is not in effect, an element for locking the sun gear against rotation at a predetermined rate of rotation of the driven shaft so as to establish the overdrive, a solenoid for moving said element to locking position, and governor controlled means for energizing said solenoid.

7. In an overdrive transmission, driving and driven shafts, planetary gearing including a sun gear which is normally free so as to render said gearing inoperative, an element for locking said sun gear against rotation so as to establish, through the medium of said gearing, an overdrive connection between said shafts, means for blocking advance of said element to locking position until rotation of the sun gear has substantially ceased, a solenoid for biasing said element toward locking position, said solenoid including an armature, an operating rod slidably associated with said armature, a spring interposed between said operating rod and said armature, adapted to be compressed so as allow the armature to be advanced by the energization of the solenoid, while the locking element is held in retracted position by said blocking means, and to thereafter project the locking element to locking position when the locking element is released by the blocking means, and governor controlled means for energizing said solenoid.

8. An overdrive transmission as defined in claim 7, including spring means for retracting the locking element.

9. An overdrive transmission as defined in claim 7, wherein said armature is in the form of a sleeve having at one end an enlarged recess to accommodate said spring, and provided with a cap for confining said spring, and wherein said operating rod is slidably extended through said sleeve into said recess and has therein an enlarged head between which, and said cap, said spring is confined.

10. An overdrive transmission as defined in claim 4, wherein the driving shaft is powered by an ignition type internal combustion engine, including manually operable means for deenergizing said holding coil and means for simultaneously interrupting the ignition of said engine, said interrupting means including a switch incorporated in said solenoid, said solenoid including an armature controlled rod for operating said locking element adapted, when retracted, to hold said switch open and, when advanced for projecting said pawl to locking position, to allow said switch to close, whereby to render said interrupting means operative only when the transmission is in overdrive ratio.

11. In an overdrive transmission, driving and driven shafts, planetary gearing including a sun gear which is normally free so as to render said gearing inoperative, an element for locking said sun gear against rotation so as to establish, through the medium of said gearing an overdrive connection between said shafts, governor controlled means for moving said element to locking position, manually operable means for establishing a 1:1 lock-up between said shafts, and means for interlocking said manually operable means and said locking element so as to prevent movement of the latter to locking position when said 1:1 lock-up is established.

12. In an overdrive transmission, driving and driven shafts, planetary gearing including a sun gear which is normally free so as to render said gearing inoperative, an element for locking said sun gear against rotation so as to establish, through the medium of said gearing an overdrive connection between said shafts, governor controlled means for moving said element to locking position, manually operable means for establishing a 1:1 lock-up between said shafts and means for interlocking said manually operable means and said locking element so as to prevent the establishing of said 1:1 lock-up when said locking element is in locking position.

13. In an overdrive transmission, driving and driven shafts, planetary gearing including a planet gear assemoly connected to the driving shaft, a normally free sun gear, and a ring gear, a jaw clutch sleeve adapted in one position to lock the ring gear to the driven shaft whereby, when the sun gear is held against rotation, the planetary gearing will establish an overdrive connection between said shafts and, in another position, to establish a direct two-way drive between said shafts, said clutch sleeve constituting the sole driving connection between the ring gear and driven shaft, manually operable means including a shift rail for moving said clutch sleeve, and an interlocking bar engageable in recesses in said locking element and said shift rail respectively, adapted when said locking element is in locking position to prevent movement of said clutch sleeve into position for establishing said two-way drive, and when said two-way drive is established, to prevent movement of said locking element to locking position.

14. In a motor vehicle transmission mechanism having planetary gearing including a sun gear, control mechanism for said sun gear comprising a shiftable member operable to hold or release said sun gear, means for shifting said member comprising an electric system including a solenoid and a pair of switches operable to open and close a circuit to the solenoid, accelerator operable mechanism for controlling one of the switches, and means responsive to vehicle speed for controlling the other switch.

15. In a system of controlling an overdrive for automotive vehicles, the combination of aligned, tubular solenoid core and armature members, a sun gear locking pawl rod extending through said members, electromagnet windings surrounding said members, a stop for limiting movement of the armature away from the core, a spring surrounding the armature for urging the armature against the stop, and a spring within a tubular recess of the armature for imparting movement from the armature to the rod.

16. In an overdrive transmission, driving and driven shafts, planetary gearing including a sun gear which is normally free so as to render said gearing inoperative, an element for locking said sun gear against rotation so as to establish, through the medium of said gearing, an overdrive connection between said shafts, a solenoid for moving said element toward locking position, governor controlled means for energizing said solenoid, energy storing means for retracting the locking element, manually operable means for establishing a 1:1 lock-up between said shafts, and means for interlocking said manually operable means and said locking element so as to prevent movement of said locking element to locking position when said 1:1 lock-up is in effect, and so as to prevent the establishment of a 1:1 lock-up when said locking element is in locking position.

17. In a power transmission for driving a motor vehicle having an internal combustion engine provided with an electrical ignition circuit, driving mechanism including a sun gear, a pawl shiftable to hold or release said sun gear, a rod fixed to said pawl, a ground line connected with the electrical ignition circuit including a self-closing switch, the open and closed positions of said switch being located to be controlled directly by said pawl rod, and means operable to shift said pawl means.

18. In a motor vehicle driving system including an engine, a throttle control therefor, a transmission including positively interengageable elements adapted when engaged to transmit drive of one ratio, means to automatically establish a drive of a different ratio upon disengagement of said elements, one of said elements being movable in opposite directions for establishing and releasing such engagement, electro-magnetic means adapted when energized to move said one element in one direction of said movement, yielding means adapted when said electromagnetic means is deenergized to move said one element in the other direction of said movement, said electromagnetic means including a moving coil and a holding coil, means operated upon the engagement of said elements for deenergizing said moving coil, a governor for controlling the energization and deenergization of said holding coil, said governor cooperating with said last mentioned means for controlling the energization and deenergization of said moving coil, and manually operated means for controlling the deenergization of said holding coil independently of said governor operated means.

19. In a motor vehicle transmission having a planetary gearing including a sun gear, control mechanism for said sun gear including a shiftable member operable to hold or release said sun gear, means for shifting said member including a solenoid, a plurality of switches operable to open and close the circuit of said solenoid, accelerator operable means for controlling one of said plurality of switches, speed responsive means for controlling one of said plurality of switches, and hand-operated means for controlling one of said plurality of said switches.

20. In a power transmission for a motor vehicle having an internal combustion engine and a driver operable engine throttle, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operably associated therewith and adapted when engaged to establish said fast speed drive, an electromagnet for moving said elements into engaged position including a holding coil and a moving coil, speed responsive means for energizing both coils of said electromagnet, means operated upon the engagement of said elements for deenergizing said moving coil, and means controlled by said throttle control for deenergizing said holding coil independently of said speed responsive means.

21. In a power transmission for driving a motor vehicle having an internal combustion engine and a driver operable engine throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operably associated therewith and adapted when engaged to establish said fast speed drive, said elements when engaged being subjected to thrust transmission during said relatively fast speed drive so as to resist disengagement of said elements to release this drive until torque delivery of the driving shaft is interrupted, an electromagnet for moving said elements into engaged position including a holding coil and a moving coil, speed responsive means for energizing both coils of said electromagnet, means operated upon engagement of said elements for disengaging said moving coil and means controlled by said throttle control for momentarily interrupting the driving torque of said driving shaft and for deenergizing said holding coil.

22. In a speed modifying mechanism for coupling a driving and a driven shaft, planetary gearing driving said driven shaft and driven by said driving shaft and including a sun gear, means for holding or releasing the sun gear of the planetary gearing, positive clutching mechanism including a clutch member shiftable to intermesh with a toothed second member for providing a one to one drive between said shafts, means operable to shift said clutch member including a rod and a yoke movable together, a manually operable mechanism operable to actuate said clutch member shift means, and means for locking said rod from such movement by said manually operable mechanism as would provide said one to one drive while said sun gear is being held.

23. A speed modifying mechanism for coupling a driving shaft and a driven shaft, planetary gearing coupled to said driving shaft including a sun gear, means operable to hold or release the sun gear, a clutch member coupling said planetary gearing with the driven shaft and shiftable to directly couple said shafts, shift means for said clutch member including a shift rod and a yoke fixed to the rod, a detent operable between said rod and said sun gear holding and releasing means to lock said rod or said sun gear holding and releasing means, said detent locking said rod from movement by said mechanism while the sun gear is held.

24. In a motor vehicle transmission mechanism having a driving shaft driven forwardly or reversely, a driven shaft, selectively established by shiftable clutch means, planetary gearing including a sun gear and drivingly coupled to said driving shaft and driving said driven shaft, a controlled pawl for holding or releasing the sun gear of the planetary gearing, positive clutching mechanism including a clutch member shiftable to intermesh with a toothed second member for providing a one to one drive between said shafts, means for actuating said clutch member comprising a shifter member engaging said clutch member, a rod on which said shifter member is mounted and with which it is movable and being operated when said driven shaft is driven reversely by the transmission mechanism and a detent operable by said pawl to lock said rod from said movement by said actuator means when said pawl is holding the sun gear.

25. In an overdrive transmission, driving and driven shafts, planetary gearing including a sun gear rendering said gearing inoperative when free, an element operable to release or to lock said sun gear against rotation so as to establish, through the medium of said gearing, an overdrive connection between said shafts, a solenoid for moving said element in one direction of its operation, yieldable means for moving said element in the opposite direction to that in which it is moved by said solenoid, governor controlled means for energizing said solenoid, and throttle controlled means for deenergizing said solenoid.

26. In an overdrive transmission, driving and driven shafts, planetary gearing including a sun gear rendering said gearing inoperative when free, an element operable to release or to lock said sun gear against rotation so as to establish, through the medium of said gearing, an overdrive connection between said shafts, a solenoid for moving said element in one direction of its operation, yieldable means for moving said element in the opposite direction to that in which it is moved by said solenoid, governor controlled means for energizing said solenoid, and throttle operated means for controlling said solenoid.

27. In an overdrive transmission, driving and driven shafts, planetary gearing for connecting said shafts including a sun gear which when free renders said gearing drivingly inoperative, a brake element shiftable to engage or release said sun gear, a spring for shifting said element in one direction, electromagnetic means for shifting said element in a direction biasing the spring, a speed responsive control means for the electromagnetic means, and means operative to nullify the effect of said speed responsive control means.

28. In an overdrive transmission, driving and driven shafts, planetary gearing including a sun gear which when free renders said gearing inoperative, a shiftable element for locking said sun gear against rotation so as to establish, through the medium of said gearing, an overdrive between said shafts, a solenoid for shifting said element in one direction when energized, yieldable means for shifting said element in the opposite direction when said solenoid is deenergized, governor operated means for controlling said solenoid, and throttle operated means for controlling said solenoid.

29. In a transmission overdrive mechanism having a planetary gearing including a sun gear and a clutch shift rod, the combination with a controlled pawl operable to hold or release the sun gear, of detent means operable by said clutch shift rod when in one position of adjustment to engage and lock said pawl in sun gear releasing position.

30. In a transmission overdrive having a tail shaft, a shaft adapted to be driven at one of a plurality of forward speeds or in reverse, planetary gearing driven by said driven shaft including a sun gear, and a clutch coupled with the tail shaft and the planetary gearing and shiftable to directly couple the shafts, the combination with clutch shifting mechanism and a controlled shiftable pawl for holding or releasing said sun gear, of interlock means between the pawl and the clutch shifting mechanism, said interlock means locking the pawl in sun gear releasing position while the clutch couples the shafts and locking the clutch shifting mechanism while the pawl holds the sun gear.

31. In a transmission overdrive having a casing, a tail shaft, a shaft adapted to be driven at one of a plurality of forward speeds or in reverse, planetary gearing driven by the driven shaft including a sun gear, and a clutch coupled with the tail shaft and the planetary gearing and shiftable to positively couple said shafts, the combination with clutch shifting mechanism including a shift rod, and a pawl slidably mounted in the casing wall for holding or releasing said sun gear, of a detent slidably mounted in the casing wall for locking the pawl in sun gear releasing position while the clutch couples said shafts and for locking the shift rod while the pawl holds the sun gear.

32. In a transmission overdrive having a casing, a tail shaft, a shaft adapted to be driven at one of a plurality of forward speeds and in reverse, planetary gearing in the casing coupled with the driven shaft and including a sun gear, and a clutch coupled with the tail shaft and the planetary gearing, said clutch being shiftable to also directly couple said shafts, the combination with clutch shifting mechanism including a shift rod having a recess therein, and a recessed pawl slidably mounted in the casing wall for holding or releasing the sun gear, of a detent slidably mounted in the casing wall and engageable at one end in the pawl recess and at the other end in the rod recess, said detent being held in the pawl recess by the rod and being held in the rod recess by the pawl, said recesses being arranged to register only when said clutch is out of coupling relation with said shafts and said pawl releases the sun gear and in all other relations the pawl or the shaft holding the detent in the recess of the other.

33. In a power transmission for driving a motor vehicle, a driving shaft adapted to receive a drive from the engine, and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operatively associated therewith and adapted when engaged to establish said fast speed drive, said elements when engaged being subjected to thrust transmission during said relatively fast speed drive so as to resist disengagement of said elements to release this drive until the torque delivery of the driving shaft is interrupted, means biasing said interengaging elements to disengaged relation to establish said relatively slow speed drive, motor means for moving and holding said interengaging elements into engaging relation for establishing said fast speed drive, means responsive to the speed of the vehicle for energizing said motor means, and driver control means for operatively deenergizing said motor means and momentarily interrupting the torque drive of the driving shaft to effect disengagement of said elements independently of said speed responsive means.

34. In a power transmission for driving a motor vehicle having an internal combustion engine provided with an electrical ignition circuit and a driver manipulated throttle control, a driving shaft adapted to receive a drive from the engine, and a driven shaft adapted to drive the vehicle, relatively slow speed driving means for driving the driven shaft from the driving shaft, relatively fast speed drive means for driving the driven shaft from the driving shaft at a speed greater than said slow speed driving means and including positively interengaging drive control elements operatively associated therewith and adapted when engaged to establish said fast speed drive, said elements when engaged being subjected to a thrust transmission during said relatively fast speed drive so as to resist disengagement of said elements to release the drive until the torque delivery of the driving shaft is interrupted, said relatively slow speed driving means including a control device operating automatically to establish this drive in response to release of said relatively fast speed driving means, means for biasing said interengaging elements to disengaging relation to establish said relatively slow speed drive, motor means for moving and holding said interengaging elements into engaging relation for establishing said fast speed drive, means responsive to the speed of the vehicle for energizing said motor means, and driver operating control means for operatively deenergizing said motor means and momentarily interrupting said engine ignition system to interrupt the delivery torque of the driving shaft for effecting a release of said interengaging elements independently of said speed responsive means.

35. In a power transmission for driving a motor vehicle, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operably associated therewith and adapted when engaged to establish said fast speed drive, said relatively slow speed driving means including a control device operating automatically to establish this drive in response to release of said relatively fast speed driving means, electromagnetic means for biasing said interengaging elements into engaging position to establish a drive through said relatively fast speed driving means, and a speed responsive governor for controlling the operation of said electromagnetic means and operable when the speed of one of said shafts reaches a predetermined point.

36. In a power transmission for driving a motor vehicle, a driving shaft adapted to receive a drive from the engine and a driven shaft adapted to drive the vehicle, relatively slow speed driving means for driving the driven shaft, relatively fast speed driving means for driving the driven shaft from the driving shaft at a speed greater than said slow speed driving means and including positively interengaging drive control elements operably associated therewith adapted when engaged to establish said fast speed drive, an electromagnet for moving said elements into engaged position and including a holding coil and a moving coil, speed responsive means for energizing both coils of said electromagnet, and means operated upon the engagement of said elements for deenergizing said moving coil.

37. In a power transmission for driving a motor vehicle, a driving shaft adapted to receive a drive from the engine, a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operably associated therewith and adapted when engaged to establish said fast speed drive, an electromagnet for moving said elements into engaged position including a holding coil and a moving coil, a relay switch electromagnetically operated for closing the circuit through said holding coil and said moving coil, and speed responsive means for energizing the electromagnet of said relay switch.

38. In a power transmission for driving a vehicle having an engine of the type equipped with an ignition system; a transmission drive-controlling element operable from a first position to a second position for effecting a change in the transmission drive; a motor operable to control operation of said element from its said first position to its said second position and adapted to be rendered inoperative thereby to accommodate return of said element to its said first position; means urging said return of said element when said motor is rendered inoperative; and means for interrupting said ignition system so as to unload said element and facilitate said return of said element by said return-urging-means when the motor is inoperative.

39. In a motor mechanism having planetary gearing including a sun gear, control mechanism for said sun gear comprising a shiftable element operable to hold or release said sun gear, means for shifting said element comprising a rod to which said element is coupled, and a solenoid comprising aligned tubular core and armature members through which said rod extends, an electromagnet winding surrounding said core and armature members, a spring surrounding the armature for biasing said element in one direction when the solenoid is deenergized, and a spring disposed in a tubular recess of said armature, operatively interposed between said armature and said element so as to be acted upon by the armature for biasing said element in the opposite direction when the solenoid is energized.

40. In a motor vehicle transmission having planetary gearing including a sun gear, control mechanism for said sun gear comprising an element shiftable to a projected position wherein it is adapted to hold said sun gear against rotation from a retracted position wherein the sun gear is free to rotate, and solenoid mechanism including an armature, having a lost motion connection with said element for moving the same, a spring operatively interposed between said armature and said element, adapted when the solenoid mechanism is energized, to be acted upon by the armature so as to bias said element toward its projected position, and a spring acting upon the said armature for retracting the same.

41. In a motor vehicle transmission mechanism having a brake element shiftable to establish two driving speeds, solenoid control means including an armature, an operating member forming a lost motion connection between said armature and said brake element for releasing the latter when the armature is retracted, a spring operatively interposed between said armature and said operating member adapted to yieldingly transmit movement from the armature to said brake element for biasing the same toward braking position, means for creating a magnetic field for projecting the armature, and a spring acting upon said armature for retracting the same.

42. In a motor vehicle transmission mechanism having plentary gearing including a sun gear, control mechanism for said sun gear comprising a pawl radially shiftable to a projected position wherein it is adapted to hold said sun gear against rotation and to thereby establish a drive through said planetary gearing, from a retracted position wherein it permits the sun gear to rotate and thereby establishes a drive of a different ratio, and solenoid mechanism including an armature, a spring operatively interposed between said armature and the pawl, adapted, when the solenoid is energized, to be acted upon by said armature so as to bias said pawl toward its projected position, and means for preventing the projection of the pawl except when the sun gear is substantially stationary.

43. In a motor vehicle driving system including an engine with an ignition system, planetary gearing adapted when one member thereof is braked, to transmit drive of one ratio, means for establishing automatically a drive of a different ratio upon release of said member for rotation, positively interengageable elements one of which is projectible radially with reference to said member into engagement with the other fixed to said member for braking said member, yielding means biasing said element toward release, a solenoid for projecting said projectible element, means for rendering inoperative the ignition system of said engine so as to facilitate the release of said projectible element, said last means including a self-closing switch, and means responsive to release of said projectible element for opening said switch.

44. In a motor vehicle driving system including an engine with an ignition system, a throttle control therefor, gearing adapted when one member thereof is braked, to transmit drive of one ratio, means for establishing automatically a drive of a different ratio upon release of said member for rotation, positively interengageable elements one of which is projectible radially with reference to said member into engagement with the other fixed to said member for braking said member, yielding means biasing said projectible element toward release, a solenoid for projecting said projectible element, means for rendering the ignition system of the engine inoperative so as to facilitate the release of said projectible element, said last means including a throttle-controlled switch and a self-closing switch, means responsive to release of said locking projectible element for opening said self-closing switch, and governor controlled means for energizing said solenoid.

45. In a motor vehicle having an engine with an ignition system and a transmission including gearing adapted, when one member thereof is braked, to transmit a drive of one ratio and including means for establishing automatically a drive of a different ratio upon release of said member for rotation, positively interengageable brake elements one of which is connected to said one member and adapted when engaged to brake said one member, means yieldingly urging the other of said elements toward its disengaged position, servo motor means for projecting said other element toward engaged position, electrically energized means acting upon said servo motor means for holding said other element in engaged position, means for deenergizing said holding means, and means for momentarily interrupting and then restoring the ignition of said engine simultaneously with the deenergization of said holding means, so as to temporarily remove the torque load on said other brake element and thereby facilitate disengagement thereof, said last means including a switch actuated in response to return of said servo motor means to brake releasing position.

46. In a motor vehicle having an engine with an ignition system and a transmission including gearing adapted, when one member thereof is braked, to transmit a drive of one ratio and including means to automatically establish a drive of different ratio upon release of said member for rotation, positively interengageable brake elements one of which is connected to said one member and adapted when engaged to brake one member, means yieldingly urging the other one of said brake elements toward disengaged position, servo motor means, yielding means interposed between said servo motor means and said other element adapted when said servo motor means is energized, to bias said other element toward engaged position, means for blocking advance of said other element to engaged position until rotation of said one member has substantially ceased, electrically energized means acting upon said servo motor means for holding said other element in engaged position, means for deenergizing said holding means and means for momentarily interrupting and then restoring the ignition of said engine simultaneously with the deenergization of said holding means so as to temporarily remove the torque load on said other element and thereby facilitate disengagement thereof, said last means including a switch actuated in response to return of said servo motor means to brake releasing position.

47. In a motor vehicle driving system including an engine provided with an ignition circuit, a throttle control therefor, planetary gearing adapted when one member thereof is braked, to transmit drive of one ratio, means for establishing automatically a drive of a lower ratio upon release of said one member for rotation, positively interengageable elements one of which is fixedly associated with said one member and the other of which is movable into engagement with said one element for braking said one member, yielding means biasing said other element in one direction of its movement, a solenoid for biasing said other element in the other direction of its movement, speed responsive means for automatically controlling said solenoid, throttle control operated means for manually controlling said solenoid, means for rendering said ignition circuit inoperative so as to facilitate the disengagement of said elements, said last means including a throttle control operated switch and a self-closing switch, and means responsive to disengagement of said elements for opening said self-closing switch.

48. In a motor vehicle driving system including an engine provided with an ignition circuit, a throttle control therefor, planetary gearing including a sun gear and adapted when said sun gear is braked to transmit drive of one ratio, means for establishing automatically a drive of a lower ratio upon release of said sun gear for rotation, a peripherally toothed annular member in fixed relation to said sun gear, a radially movable pawl adapted to coact with said toothed member for braking the sun gear, yielding means biasing said pawl in one direction of its movement, a solenoid for biasing the pawl in the other direction of its movement, means for rendering said ignition circuit inoperative so as to facilitate the disengagement of said pawl from said toothed member, said last means including a throttle control operated switch and a self-closing switch, means responsive to movement of said pawl to disengage position for opening said self-closing switch, and means including a governor for controlling the operation of said solenoid.

49. In a motor vehicle driving system including an engine, a throttle control therefor, planetary gearing including a sun gear and adapted, when said sun gear is braked, to transmit a drive of one ratio, means for establishing automatically a drive of a different ratio upon release of said sun gear for rotation, positively interengageable elements one of which is connected to said sun gear and adapted, when engaged, to brake said sun gear, the other one of said elements being movable in opposite directions for establishing and releasing such engagement, electro-magnetic means adapted when energized to move said other element in one direction of said movement, yielding means adapted when said electro-magnetic means is deenergized to move said other element in the other direction of said movement, and means for controlling the operation of said electro-magnetic means, said controlling means including a governor for automatic control of the engagement and disengagement of said elements and including throttle control operated means for controlling the disengagement of said elements independently of said governor.

50. In a motor vehicle driving system including an engine with an ignition system, a throttle control therefor, planetary gearing including a sun gear and adapted, when said sun gear is braked, to transmit a drive of one ratio, means for establishing automatically a drive of a different ratio upon release of said sun gear for rotation, positively interengageable elements one of which is connected to said sun gear and adapted, when engaged, to brake said sun gear, the other one of said elements being movable in opposite directions for establishing and releasing such engagement, electro-magnetic means adapted when energized to move said other element in one direction of said movement, yielding means adapted when said electro-magnetic means is deenergized to move said other element in the other direction of said movement, and means for controlling the operation of said electro-magnetic means, said controlling means including a governor for automatic control of the engagement and disengagement of said elements and including manually operated means for rendering inoperative the ignition system of said engine so as to facilitate said disengagement.

51. In a motor vehicle driving system including an engine, a throttle control therefor, means including positively interengageable elements adapted when engaged, to effect the transmission of drive of one ratio, means for establishing automatically a drive of a different ratio upon disengagement of said elements, one of said elements being movable in opposite directions for establishing and releasing such engagement, electro-magnetic means adapted when energized to move said one element in one direction of said movement, yielding means adapted when said electro-magnetic means is deenergized to move said one element in the other direction of said movement, and means for controlling the operation of said electro-magnetic means, said controlling means including a governor for automatic control of the engagement and disengagement of said elements and including throttle control operated means for controlling the disengagement of said elements independently of said governor.

52. In a motor vehicle driving system including an engine provided with an ignition system, a throttle control therefor, means including positively interengageable elements adapted when engaged to effect the transmission of drive of one ratio, means for establishing automatically a drive of a different ratio upon disengagement of said elements, one of said elements being movable in opposite directions for establishing and releasing such engagement, electro-magnetic means adapted when energized to move said one element in one direction of said movement, yielding means adapted when said electro-magnetic means is deenergized to move said one element in the other direction of said movement, and means for controlling the operation of said electro-magnetic means, said controlling means including a governor for automatic control of the engagement and disengagement of said elements and including manually operated means for controlling the disengagement of said elements independently of said governor, and means controlled by said manually operated means for rendering inoperative said ignition system so as to facilitate said disengagement.

53. In a motor vehicle transmission including planetary gearing adapted, when one member thereof is braked, to transmit a drive of one ratio and including means for establishing automatically a drive of a different ratio upon release of said member for rotation, positively interengageable brake elements associated with said one member for braking the same when engaged, means yieldingly urging one of said brake elements toward disengaged position, electro-magnetic means for moving said one element toward engaged position, governor controlled means for energizing and deenergizing said electro-magnetic means, and manually controlled means for deenergizing said electro-magnetic means independently of said governor controlled means.

54. In a motor vehicle having an engine throttle and a transmission including positively interengageable elements adapted when engaged to effect the transmission of a drive of one ratio, and including means for establishing automatically a drive of a different ratio upon disengagement of said elements, means yieldingly urging one of said elements toward disengaged position, electro-magnetic means for moving said one element toward engaged position, governor controlled means for energizing and deenergizing said electro-magnetic means, and throttle control operated means for deenergizing said electro-magnetic means independently of said governor controlled means.

55. In a motor vehicle having an engine throttle control and a transmission including planetary gearing adapted, when the sun gear thereof is braked to effect the transmission of a drive of one ratio and including means for establishing automatically a drive of a different ratio upon release of said member for rotation, positively interengageable brake elements adapted when engaged to brake said sun gear, means yieldingly urging one of said brake elements toward disengaged position, electro-magnetic means for moving said one element toward engaged position, governor controlled means for energizing and deenergizing said electro-magnetic means, and throttle control operated means for deenergizing said electro-magnetic means independently of said governor controlled means.

56. In a motor vehicle having an engine, a throttle control therefor, means for providing said engine with ignition, a transmission including positively interengageable elements adapted when engaged to effect the transmission of a drive of one ratio and including means for establishing automatically a drive of a different ratio upon disengagement of said elements, means yieldingly urging one of said elements toward disengaged position, electro-magnetic means for moving said one element toward engaged position, governor controlled means for energizing and deenergizing said electro-magnetic means, throttle control operated means for deenergizing said electro-magnetic means, and throttle control operated means for momentarily interrupting said ignition for facilitating the disengagement of said elements.

57. In a motor vehicle having an engine, a throttle control therefor, means for providing said engine with ignition, a transmission including positively interengageable elements adapted when engaged to establish a drive of one ratio, said elements being freely disengageable only when the transmission of torque therebetween is interrupted, means yieldingly urging one of said elements toward its disengaged position, a servo motor, yielding means interposed between the servo motor and said one element, adapted under energized action of said servo motor to urge said one element toward its engaged position, electrically controlled means for holding said one element in engaged position, throttle control operated means for momentarily interrupting said ignition to remove the torque load on said one element, said holding means being arranged to respond to the ignition interrupting movement of said throttle control so as to release said one element for movement to disengaged position during the interruption of the ignition.

58. In a motor vehicle having an engine, a throttle control therefor, means for providing said engine with ignition, a transmission including means adapted to transmit a drive of one ratio, said means including positively interengageable elements adapted when engaged to establish said drive, means for establishing automatically a drive of a different ratio upon disengagement of said elements, means yieldingly urging one of said elements toward its disengaged position, electro-magnetic means for projecting said one element toward engaged position, said electro-magnetic means including a moving coil adapted to be deenergized in response to the projection of said one element and a holding coil for maintaining said one element in engaged position, a governor for automatically controlling the energization of both of said coils and the deenergization of said holding coil, and throttle control operated means adapted in a single movement of the throttle control to deenergize said holding coil when the governor is tending to energize the same and to interrupt said ignition so as to temporarily remove the torque load on said elements to facilitate disengagement thereof.

59. In a power transmission for driving a motor vehicle having an internal combustion engine with an ignition system and driver operable engine throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than the slow speed driving means and including interengaging drive control elements operatively associated therewith and adapted when engaged to establish said fast speed drive, said elements when engaged being subjected to thrust transmission during said relatively fast speed drive so as to resist disengagement of said elements to release this drive until the torque delivery of the driving shaft is momentarily interrupted, said relatively slow speed driving means including a control device operating automatically to establish this drive in response to release of said relatively fast speed driving means, means for biasing said interengaging elements to establish said relatively slow speed drive, motor means for moving and holding said interengaging elements into engaging relation for establishing said fast speed drive, means responsive to the speed of the vehicle for energizing said motor means, and means operated by said throttle control for momentarily interrupting said engine ignition system to interrupt the torque drive on said driving shaft and operatively deenergizing said motor to permit the establishment of said relatively slow speed drive independently of said speed responsive means.

60. In a power transmission for driving a motor vehicle having an internal combustion engine provided with an electrical ignition circuit and a driver manipulated throttle control, a driving shaft adapted to receive a drive from the engine and a driven shaft adapted to drive from said driving shaft, planetary gearing operable between said shafts for driving the driven shaft from said driving shaft, said gearing including a rotatable control gear adapted to be held from rotation to provide said drive through said gearing, positively interengaging members one of which is connected to said control gear and selectively operable into engaging position to hold said control gear to provide said drive through said gearing, means for establishing automatically a drive other than by said gearing when said interengaging members are disengaged, said members when engaged being subjected to torque during said drive through said gearing so as to resist disengagement of said members to release this drive until the torque delivery of the driving shaft is interrupted, a servo-motor for shifting said engageable members into engaging position, means responsive to the speed of the vehicle for controlling the energization and deenergization of said motor, and means controlled by said throttle control for momentarily interrupting the ignition system to momentarily interrupt the driving torque of said driving shaft and for deenergizing said motor independently of said speed responsive device.

61. In a power transmission for driving a motor vehicle having an engine provided with an electrical ignition circuit and a driver manipulated throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operably associated therewith and adapted when engaged to establish said fast speed drive, said elements when engaged being subjected to torque during said relatively fast speed drive so as to resist disengagement of said elements to release this drive until torque delivery of the driving shaft is momentarily interrupted, an electromagnet for moving said elements into engaged position including a holding coil and a moving coil, speed responsive means for energizing both said coils of said electromagnet, means operated upon the engagement of said elements for deenergizing said moving coil and throttle control operated means for momentarily interrupting the ignition circuit and for deenergizing said holding coil independently of said speed responsive means.

References Cited in the file of this patent

UNITED STATES PATENTS

| | | |
|---|---|---|
| 1,447,837 | De Normanville | Mar. 6, 1923 |
| 2,008,231 | Vincent | July 16, 1935 |
| 2,051,553 | Fleischel | Aug. 18, 1936 |
| 2,120,555 | Good | June 14, 1938 |
| 2,127,637 | Barnes | Aug. 23, 1938 |
| 2,176,202 | Carnagua | Oct. 17, 1939 |
| 2,177,872 | Dunn | Oct. 31, 1939 |
| 2,183,485 | Butzbach | Dec. 12, 1939 |

FOREIGN PATENTS

| | | |
|---|---|---|
| 647,711 | Germany | June 24, 1937 |

OTHER REFERENCES

Publication, Automotive Industries, issue of Sept. 24, 1938, pp. 374 and 375.